Sept. 29, 1942.   W. R. UHLEMANN   2,297,086
EYEGLASS MOUNTING
Filed July 27, 1939
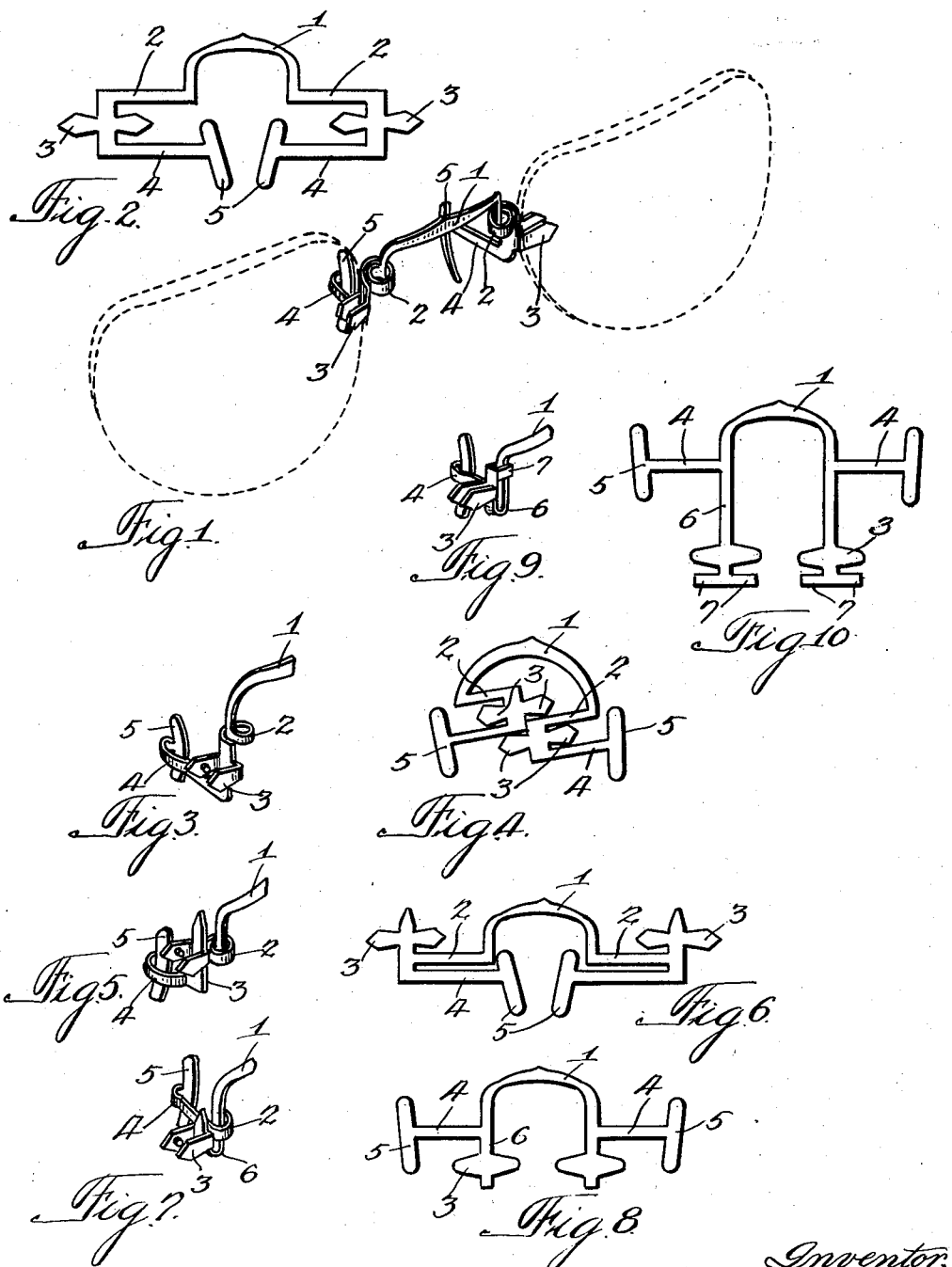
Inventor.
William R. Uhlemann.
By Ames, Thiess, Olsen & Mecklenburger
Attys.

Patented Sept. 29, 1942

2,297,086

UNITED STATES PATENT OFFICE 2,297,086

EYEGLASS MOUNTING

William R. Uhlemann, Evanston, Ill., assignor to Uhlemann Optical Co. of Illinois, Chicago, Ill., a corporation of Delaware Application July 27, 1939, Serial No. 286,748

4 Claims. (Cl. 88—41)

My invention relates to eyeglass mountings.

One of the objects of my invention is to provide an improved eyeglass mounting in which the guard arms in flexing toward and from each other shall in general cause flexion about vertical axes instead of about horizontal axes. This action has advantages in that in lenses ground to take care of astigmatism in which the lenses are ground about a definite axis, the axes on which the lenses are ground do not have their angle of inclination changed as the guards are sprung apart to fit the nose. If, as has been the practice, the mounting is so designed that spreading the nose guards apart and placing them on the nose causes a change in the inclination of the axis, the lenses are thrown out of the position for which they were designed and thus interfere with vision.

My improved flexing action has a further advantage in that the pressure of the nose guards on the nose is more evenly distributed and thus more comfortable.

A further object of my invention is to provide a mounting of the type indicated in which the entire mounting including the bridge, springs, nose guard arms, nose guards, and straps are formed of a single integral piece of sheet metal.

A further object of my invention is to provide a mounting as indicated above formed of a single piece of sheet metal in which the parts are so designed as to avoid waste of material in the blank.

A further object of my invention is to provide a mounting including a ribbon-like spring portion in which the grain caused in processing the sheet material runs lengthwise of the ribbon.

Further objects will appear from the description and claims.

In the drawing, in which several forms of my invention are shown:

Fig. 1 is a perspective view of an eyeglass and mounting;

Fig. 2 is a plan view of the blank from which this mounting is formed;

Fig. 3 is a fragmentary view showing another form of mounting;

Fig. 4 is a plan view of the blank from which the mounting of Fig. 3 is formed;

Fig. 5 is a fragmentary perspective view of another form of mounting;

Fig. 6 shows the blank from which the mounting of Fig. 5 is formed;

Fig. 7 is a fragmentary perspective view of another form of mounting;

Fig. 8 is the blank from which the mounting of Fig. 7 is formed;

Fig. 9 is a fragmentary perspective view of another form of mounting; and

Fig. 10 is the blank from which the mounting of Fig. 9 is formed.

Referring first to Figs. 1 and 2, the construction here shown comprises a mounting formed of a single integral piece of sheet material, the blank for which is shown in Fig. 2 comprising a bridge portion 1, a coil torsion ribbon-like spring portion 2, a strap portion 3 for embracing and holding the bridge to the lens, a ribbon-like nose guard arm 4, and a nose guard 5 supported on the end of this arm.

It will be noted that the construction is such that all planes tangent to the sides of the ribbon-like bridge, coil spring 2 and nose guard arms 4 are substantially vertical so that flexing of the ribbon-like parts of the mounting in placing the nose guards in position on the nose will take place about vertical axes. This will insure that the angle of inclination of the axes of the lenses will not be disturbed in fitting the mounting to the nose. It also insures that the nose guards will exert a substantially even pressure on the nose when the fitting is in position. In Figs. 1 and 2 the lens-supporting straps 3 are in general positioned between the ribbon-like coil spring 2 and the ribbon-like nose guard arm 4.

The construction shown in Figs. 3 and 4 is similar in general to that shown in Figs. 1 and 2, but in Figs. 3 and 4, the coil spring 2 extends forwardly and inwardly from the inner edge of the bridge portion rather than from the outer edge of the bridge portion, as in Fig. 1.

The blank from which the mounting of Fig. 3 is formed has the ribbon-like portions from which the coil springs 2 and guard arms 4 are formed extending at a slight angle to the horizontal, so that the strap portions 3 do not lie in the same horizontal plane, thus enabling the parts to be formed from a single sheet of material.

The construction shown in Figs. 5 and 6 is similar to the construction of Figs. 1 and 2, except that in Fig. 5 the strap flanges 3 are located above the ribbon-like coil springs 2 whereas in Fig. 2 the strap flanges 3 are located between the coil spring portions 2 and the nose guard arms 4.

In the construction shown in Figs. 7 and 8, the nose guard arms comprise a coil torsion spring portion 2 and an arm portion 4 extending rearwardly therefrom. The strap flanges 3 which embrace the lens are mounted on a U-shaped supporting portion 6 which extends downwardly from the lower portion of the bridge 1.

The construction shown in Figs. 9 and 10 is similar to that shown in Figs. 7 and 8 except that the U-shaped portion 6 which supports the strap flanges 3 is extended upwardly and provided with laterally extending finger portions 7 which embrace a vertical portion of the bridge 1 to hold the straps in proper position with respect to the bridge.

It will be seen that in all of the forms the bridge 1, coil torsion spring 2, nose guard arms 4, nose guards 5, and lens-engaging straps 3 are formed of a single integral piece of sheet material and that in all of them the bridge 1, coil torsion spring 2 and nose guard arms 4 are of ribbon-like formation so shaped that all planes tangent to the sides of the ribbon-like formations are substantially vertical so that flexing of these ribbon-like portions takes place about vertical axes.

While, as indicated above, it may be preferable to form the entire mounting from a single integral piece of sheet material, it is obvious that it might be formed by soldering or otherwise securing the parts of sheet material together and then stamping out the blank. It is obvious that the nose guards may be provided with suitable nose guard pads formed of sharkskin or other suitable material.

Further modifications will be apparent to those skilled in the art and it is desired, therefore, that the invention be limited only by the prior art and the scope of the appended claims.

Having thus described my invention, what I claim and desire to secure by Letters Patent is:

1. A lens mounting comprising a single piece of sheet metal shaped to provide a ribbon-like bridge having an upright leg portion on each side thereof, a lens strap on each side of said bridge, a ribbon-like strap-supporting arm connecting each strap with one leg of said bridge, and a ribbon-like arm extending from said strap to provide a nose guard support, each strap comprising a strip extending along the edge portion of the lens and a portion extending over a face portion of the lens, said strap-supporting arm and nose guard supporting arm extending from the same edge of said edgewise-extending strip and said facewise-extending portion also extending from said same edge, and lines extending transversely of said ribbon-like bridge and ribbon-like arms being substantially vertical whereby said bridge and arms flex about vertical axes.

2. A lens mounting comprising a single piece of sheet metal shaped to provide a ribbon-like bridge having an upright leg portion on each side thereof, a lens strap on each side of said bridge, a ribbon-like strap-supporting arm connecting each strap with one leg of said bridge, and a ribbon-like arm extending from said strap to provide a nose guard support, each strap comprising a strip extending along the edge portion of the lens and a portion extending over a face portion of the lens, said strap-supporting arm and nose guard supporting arm extending from the same edge of said edgewise-extending strip and said facewise-extending portion also extending from said same edge between said strap-supporting arm and said nose guard supporting arm, and lines extending transversely of said ribbon-like bridge and ribbon-like arms being substantially vertical whereby said bridge and arms flex about vertical axes.

3. A lens mounting comprising a single piece of sheet metal shaped to provide a bridge, a lens strap on each side of said bridge, a strap-supporting arm connecting each strap with said bridge, and an arm extending from said strap to provide a nose guard support, each strap comprising a strip extending along the edge portion of the lens and a portion extending over a face portion of the lens, said strap-supporting arm and nose guard supporting arm extending from the same edge of said edgewise-extending strip, and said bridge having an upright leg portion on each side about the axis of which said strap-supporting arm extends.

4. A lens mounting comprising a single piece of sheet metal shaped to provide a ribbon-like bridge having an upright leg portion on each side thereof, a lens strap on each side of said bridge, a ribbon-like strap-supporting arm connecting each strap with one leg of said bridge, and a ribbon-like arm extending from said strap to provide a nose guard support, each strap comprising a strip extending along the edge portion of the lens and a portion extending over a face portion of the lens, said strap-supporting arm and nose guard supporting arm each extending from an edge of said edgewise-extending strip and the said strap-supporting arm extending about the axis of said upright leg portion on each side of said bridge, and lines extending transversely of said ribbon-like bridge and ribbon-like arms being substantially vertical whereby said bridge and arms flex about vertical axes.

WILLIAM R. UHLEMANN.